US012555914B2

(12) United States Patent
Wu et al.

(10) Patent No.: US 12,555,914 B2
(45) Date of Patent: Feb. 17, 2026

(54) ANTENNA MODULE

(71) Applicant: PEGATRON CORPORATION, Taipei (TW)

(72) Inventors: Chao-Hsu Wu, Taipei (TW); Chien-Yi Wu, Taipei (TW); Hao-Hsiang Yang, Taipei (TW); Tse-Hsuan Wang, Taipei (TW); Chih-Wei Liao, Taipei (TW); Hau Yuen Tan, Taipei (TW); Shih-Keng Huang, Taipei (TW); Chia-Hung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 82 days.

(21) Appl. No.: 18/770,374

(22) Filed: Jul. 11, 2024

(65) Prior Publication Data

US 2025/0149797 A1 May 8, 2025

(30) Foreign Application Priority Data

Nov. 3, 2023 (TW) ................................ 112142411

(51) Int. Cl.
*H01Q 9/42* (2006.01)
*H01Q 1/48* (2006.01)
*H01Q 5/50* (2015.01)
*H01Q 9/04* (2006.01)

(52) U.S. Cl.
CPC ................. *H01Q 9/42* (2013.01); *H01Q 1/48* (2013.01); *H01Q 5/50* (2015.01); *H01Q 9/0457* (2013.01)

(58) Field of Classification Search
CPC .. H01Q 9/42; H01Q 1/48; H01Q 5/50; H01Q 9/0457; H01Q 5/371
See application file for complete search history.

(56) References Cited

U.S. PATENT DOCUMENTS 6,992,627 B1 * 1/2006 Honda ................ H01Q 9/0421 343/702
7,050,010 B2 * 5/2006 Wang .................. H01Q 9/0421 343/702

(Continued)

FOREIGN PATENT DOCUMENTS

JP 2009111959 A * 5/2009
TW 201205958 2/2012
TW I766213 6/2022

*Primary Examiner* — Dameon E Levi
*Assistant Examiner* — Jordan E. DeWitt
(74) *Attorney, Agent, or Firm* — J.C. PATENTS

(57) ABSTRACT

An antenna module includes a ground radiator, a first antenna, and a second antenna. The first antenna comprises a first radiator, a second radiator, and a third radiator. The first radiator and the second radiator resonate at a low frequency band and a first high frequency band, and a part of the first radiator and the third radiator resonate at a second high frequency band. The second antenna includes a fourth radiator, the second radiator, and a connecting section. The connecting section is connected between the fourth radiator and the second radiator. A part of the fourth radiator, the connecting section, and the second radiator resonate at the low frequency band and the second high frequency band, and the fourth radiator, the connecting section, and a part of the second radiator resonate at the first high frequency band.

11 Claims, 8 Drawing Sheets

(56) References Cited

U.S. PATENT DOCUMENTS 7,091,908 B2 * 8/2006 Fabrega-Sanchez .. H01Q 1/243 343/893
7,535,422 B2 * 5/2009 Liu .......... H01Q 9/42 343/702
7,612,725 B2 * 11/2009 Hill .......... H01Q 1/521 343/702
7,864,123 B2 * 1/2011 Hill .......... H01Q 5/371 343/702
8,144,062 B2 * 3/2012 Ke .......... H01Q 5/371 343/702
8,248,312 B2 * 8/2012 Guan .......... H01Q 5/371 343/702
8,659,492 B2 * 2/2014 Lee .......... H01Q 5/357 343/749
8,723,739 B2 * 5/2014 Liu .......... H01Q 1/38 343/702
9,048,528 B1 * 6/2015 Lee .......... H01Q 5/378
10,615,492 B2 * 4/2020 Kerselaers .......... H01Q 21/30
10,637,147 B2 * 4/2020 Oh .......... H01Q 5/378
11,201,413 B1 * 12/2021 Lin .......... H01Q 21/28
11,349,219 B2 * 5/2022 Toyao .......... H01Q 13/106
11,552,391 B2 * 1/2023 Huang .......... H01Q 1/523
2004/0032371 A1 * 2/2004 Mendolia .......... H04B 15/02 343/702
2009/0174604 A1 * 7/2009 Keskitalo .......... H01Q 9/0442 343/848
2010/0013732 A1 * 1/2010 Kapuliansky .......... H01Q 1/38 343/866
2010/0103069 A1 * 4/2010 Wang .......... H01Q 5/371 343/846
2011/0043427 A1 * 2/2011 Lee .......... H01Q 1/38 343/850
2011/0050528 A1 3/2011 Montgomery
2012/0188141 A1 * 7/2012 Islam .......... H01Q 1/243 343/860
2012/0200461 A1 * 8/2012 Lee .......... H01Q 9/42 343/700 MS
2012/0242555 A1 * 9/2012 Hsieh .......... H01Q 5/378 343/860
2012/0249393 A1 * 10/2012 Hotta .......... H01Q 7/00 343/843
2012/0274517 A1 * 11/2012 Nagoshi .......... H01Q 5/357 343/700 MS
2013/0044036 A1 * 2/2013 Kuonanoja .......... H01Q 5/371 343/893
2013/0057443 A1 * 3/2013 Asanuma .......... H01Q 5/314 343/751
2014/0104119 A1 4/2014 Montgomery et al.
2014/0361948 A1 * 12/2014 Tanaka .......... H01Q 1/243 343/861
2015/0171508 A1 * 6/2015 Jeon .......... H01Q 5/307 343/702
2015/0333390 A1 * 11/2015 Peng .......... H01Q 5/378 343/702
2016/0218416 A1 * 7/2016 Van Wonterghem .. H01Q 1/243
2016/0294057 A1 10/2016 Chiu
2017/0237166 A1 * 8/2017 Wu .......... H01Q 1/241 343/700 MS
2020/0083603 A1 * 3/2020 Wu .......... H01Q 7/00
2021/0098878 A1 * 4/2021 Wu .......... H01Q 11/14
2021/0135351 A1 * 5/2021 Son .......... H01Q 5/328
2021/0175631 A1 * 6/2021 Wu .......... H01Q 13/16
2021/0336338 A1 * 10/2021 Chang .......... H01Q 13/106
2022/0224008 A1 * 7/2022 Komura .......... H01Q 5/20
2022/0247078 A1 * 8/2022 Wang .......... H01Q 5/378
2022/0344804 A1 * 10/2022 Wu .......... H01Q 9/0428
2022/0344814 A1 * 10/2022 Tan .......... H01Q 5/371
2022/0344815 A1 * 10/2022 Wu .......... H01Q 9/42
2022/0352645 A1 * 11/2022 Shao .......... H01Q 21/24
2023/0042814 A1 * 2/2023 Lee .......... H01Q 5/371
2023/0369765 A1 * 11/2023 Li .......... H01Q 9/285
2024/0170843 A1 * 5/2024 Shen .......... H01Q 21/28
2024/0322436 A1 * 9/2024 Yun .......... H01Q 25/00
2025/0096476 A1 * 3/2025 Wu .......... H01Q 5/371
2025/0149797 A1 * 5/2025 Wu .......... H01Q 9/42

* cited by examiner

ANTENNA MODULE

CROSS-REFERENCE TO RELATED APPLICATION

This application claims the priority benefit of Taiwan application serial no. 112142411, filed on Nov. 3, 2023. The entirety of the above-mentioned patent application is hereby incorporated by reference herein and made a part of this specification.

BACKGROUND

Technical Field

The disclosure relates to an antenna module, and in particular to an antenna module having dual antennas.

Description of Related Art

With the advancement of technology, the specification requirements for wireless transmission are getting higher and higher. How to arrange more antennas in an available space to meet the requirement of multiple frequency bands has become the current research direction.

SUMMARY

The disclosure provides an antenna module, which has dual antennas. The dual antennas share a part of the radiators, which can effectively reduce the occupied space and can resonate at multiple frequency bands.

An antenna module of the disclosure includes a ground radiator, a first antenna, and a second antenna. The first antenna includes a first radiator, a second radiator, and a third radiator. The first radiator and the second radiator resonate at a low frequency band and a first high frequency band, and a part of the first radiator and the third radiator resonate at a second high frequency band. The second antenna includes a fourth radiator, a second radiator, and a connecting section. The connecting section connects the fourth radiator with the second radiator. A part of the fourth radiator, the connecting section, and the second radiator resonate at the low frequency band and the second high frequency band, and the fourth radiator, the connecting section, and a part of the second radiator resonate at the first high frequency band.

In an embodiment of the disclosure, a first slot is formed between the first radiator and the ground radiator, a second slot is formed between the first radiator and the second radiator and between the first radiator and the third radiator, a third slot is formed between the second radiator and the third radiator, a fourth slot is formed between the fourth radiator and the ground radiator and between the fourth radiator and the second radiator, a fifth slot is formed between the fourth radiator and the second radiator, and the connecting section separates the fourth slot from the fifth slot.

In an embodiment of the disclosure, the first radiator includes a first section and a second section connected with each other, the second radiator includes a third section, a fourth section, and a fifth section connected in sequence, the third radiator includes a sixth section and a seventh section connected with each other, the first slot is formed between the first section and the ground radiator, the fifth section is located next to the first section and the second section, the sixth section is located between the first section and the third section, the seventh section is located between the first section and the fourth section, the second slot is formed between the fifth section and the second section and between the seventh section and the first section, the part of the first radiator is the first section, and the part of the second radiator is the third section.

In an embodiment of the disclosure, the fourth radiator includes an eighth section and a ninth section connected with each other, the connecting section connects the third section with the eighth section, the ninth section extends from the eighth section toward the fourth section, the fourth slot is formed between the eighth section and the third section, the fifth slot is formed between the ninth section and the fourth section, and the part of the fourth radiator is the eighth section.

In an embodiment of the disclosure, the first radiator includes a first feed end, the fourth radiator includes a second feed end, and a distance between the first feed end and the second feed end is 0.25 times to 0.5 times a wavelength of the low frequency band.

In an embodiment of the disclosure, the antenna module further includes a first matching circuit and a second matching circuit. The first matching circuit and the second matching circuit are connected between the first radiator and the ground radiator.

In an embodiment of the disclosure, the first matching circuit includes a capacitance element, the second matching circuit includes an inductance element, and the first matching circuit and the second matching circuit jointly form a band rejection filter.

In an embodiment of the disclosure, the antenna module further includes a second feed end and a third matching circuit. The second feed end is located between the fourth radiator and the ground radiator, and the third matching circuit is connected to the second feed end and the fourth radiator.

In an embodiment of the disclosure, the antenna module further includes a disconnected section and a fourth matching circuit. The fourth matching circuit is connected to the disconnected section and the fourth radiator, the part of the first radiator is connected to a first conductive via, the disconnected section is connected to a second conductive via, the first conductive via and the second conductive via are connected through a connecting line, and the connecting line and the first radiator and the disconnected section are located on different planes.

In an embodiment of the disclosure, the antenna module further includes a fifth matching circuit. A seventh section of the third radiator includes two separate sub-sections, and the fifth matching circuit is connected to the two sub-sections.

In an embodiment of the disclosure, the antenna module further includes a sixth matching circuit connected to the second radiator and the third radiator.

Based on the above, the antenna module of the disclosure includes the first antenna and the second antenna. The first antenna and the second antenna share the second radiator. The first antenna may resonate at the low frequency band and the first high frequency band through the first radiator and the second radiator, and the part of the first radiator and the third radiator may resonate at the second high frequency band. The second antenna may resonate at the low frequency band and the second high frequency band through the part of the fourth radiator, the connecting section, and the second radiator, and resonate at the first high frequency band through the fourth radiator, the connecting section, and the part of the second radiator. Each of the first antenna and the second antenna of the antenna module of the disclosure may be excited by strong coupling to generate multiple resonant frequency bands, and the first antenna and the second antenna share the second radiator, which can effectively reduce the space occupied.

DESCRIPTION OF THE EMBODIMENTS

Figure 1A:
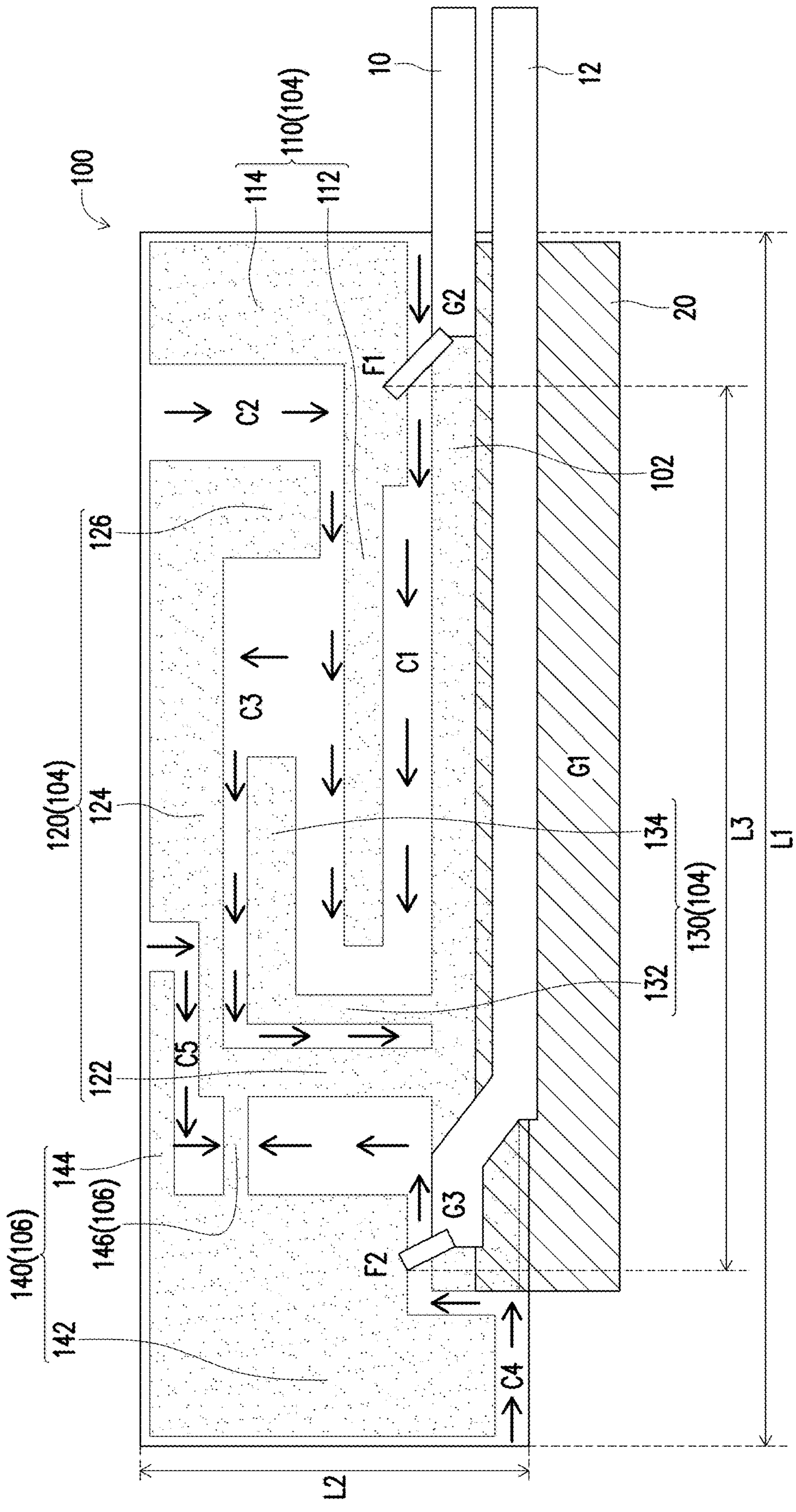
FIG. 1A is a schematic diagram of an antenna module according to an embodiment of the disclosure.
Figure 1B:
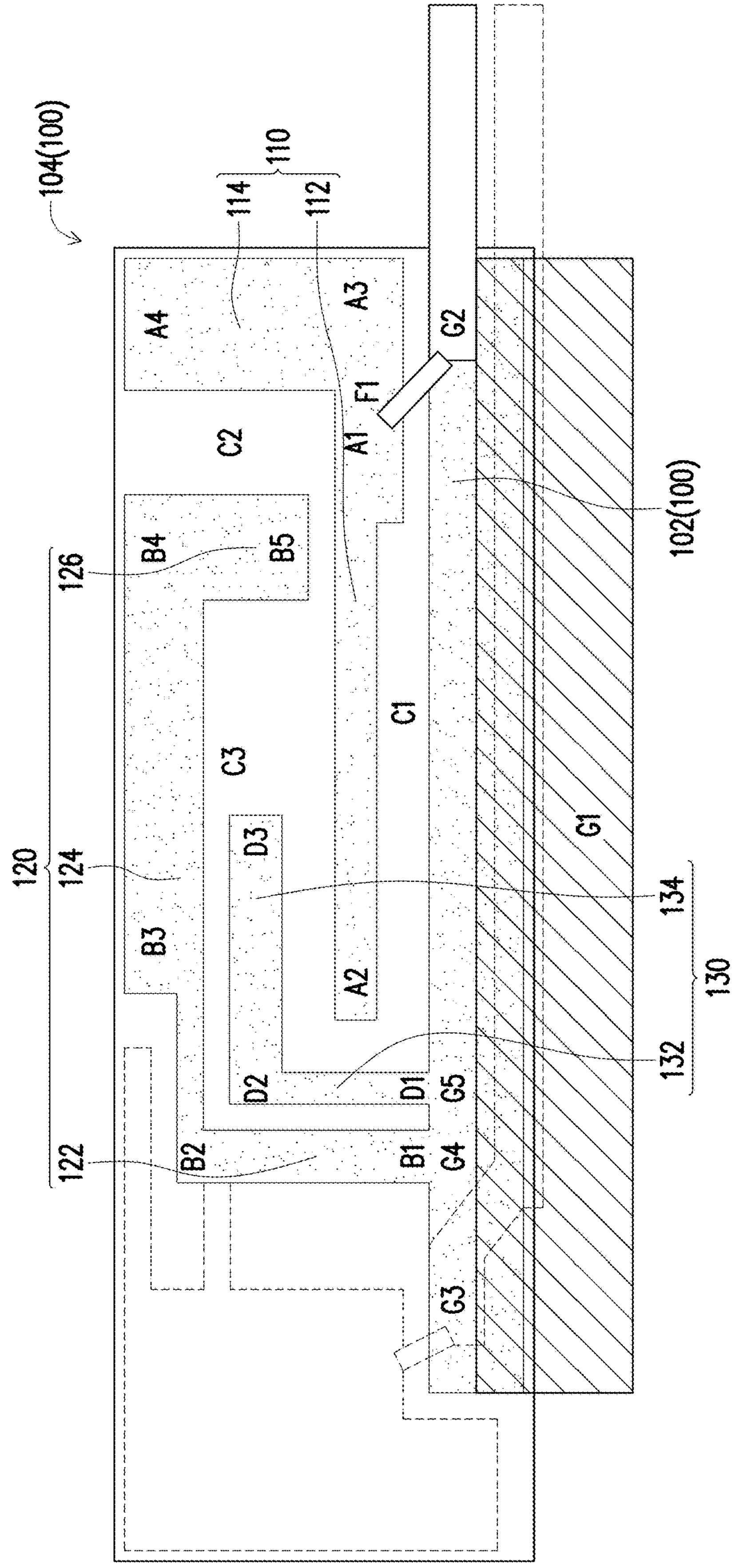
FIG. 1B is a schematic diagram of a first antenna of the antenna module of FIG. 1A.
Figure 1C:
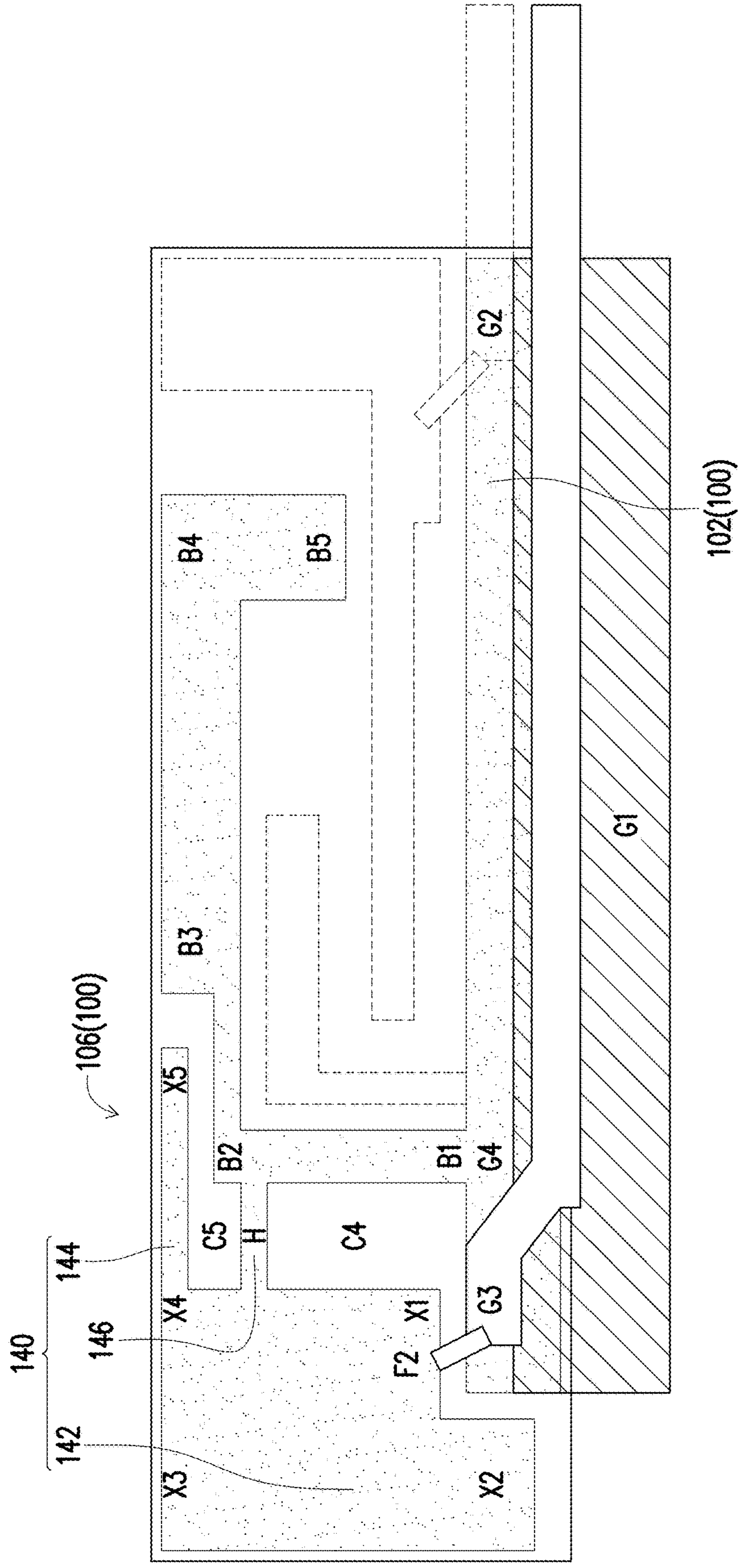
FIG. 1C is a schematic diagram of a second antenna of the antenna module of FIG. 1A.

FIG. 1A is a schematic diagram of an antenna module according to an embodiment of the disclosure. FIG. 1B is a schematic diagram of a first antenna of the antenna module of FIG. 1A. FIG. 1C is a schematic diagram of a second antenna of the antenna module of FIG. 1A. It should be noted that in order to clearly show the first antenna in FIG. 1B, the second antenna is shown with dotted lines. In order to clearly show the second antenna in FIG. 1C, parts of the first antenna not mentioned are shown with dotted lines.

Please refer to FIG. 1A to FIG. 1C. An antenna module 100 of the embodiment includes a ground radiator 102, a first antenna 104, and a second antenna 106. In the embodiment, each of the first antenna 104 and the second antenna 106 may resonate at a low frequency band (for example, Wi-Fi 2.4G, 2400 MHz to 2484 MHz) and a high frequency broadband. The high frequency broadband covers, for example, a first high frequency band (for example, Wi-Fi 5G, 5000 MHz to 5500 MHz) and a second high frequency band (for example, Wi-Fi 6E, 5500 MHz to 8000 MHz), which may meet Wi-Fi 7 application bandwidth. Of course, the frequency bands generated by the first antenna 104 and the second antenna 106 are not limited thereto.

The first antenna 104 includes a first feed end F1. A positive electrode of a coaxial transmission line 10 is connected to the first feed end F1, and a negative electrode of the coaxial transmission line 10 is connected to a position G2 of the ground radiator 102. The second antenna 106 includes a second feed end F2. A positive electrode of a coaxial transmission line 12 is connected to the second feed end F2, and a negative electrode of the coaxial transmission line 12 is connected to a position G3 of the ground radiator 102. The ground radiator 102 is connected to a system ground plane (not shown) via a copper foil 20 (position G1).

As can be seen from FIG. 1B, the first antenna 104 is disposed next to the ground radiator 102 and includes a first radiator 110 (positions A1 to A4), a second radiator 120 (positions B1 to B5), and a third radiator 130 (positions D1 to D3). In the embodiment, the first antenna 104 is a coupling feed. The first radiator 110 (positions A1 to A4), the second radiator 120 (positions B1 to B5), and the third radiator 130 (positions D1 to D3) form an open-loop antenna.

The first radiator 110 and the ground radiator 102 are separated by a first slot C1. Specifically, the first radiator 110 includes a first section 112 (positions A1 to A3) and a second section 114 (positions A3 and A4) connected with each other. The first feed end F1 of the first radiator 110 is located in the first section 112, and the first slot C1 is formed between the first section 112 and the ground radiator 102.

The second radiator 120 and the third radiator 130 are connected to the ground radiator 102. A second slot C2 (FIG. 1A) is formed between the first radiator 110 and the second radiator 120 and between the first radiator 110 and the third radiator 130, and a third slot C3 (FIG. 1A) is formed between the second radiator 120 and the third radiator 130.

Specifically, the second radiator 120 includes a third section 122 (positions B1 and B2), a fourth section 124 (positions B2 to B4), and a fifth section 126 (positions B4 and B5) connected in sequence, and the third radiator 130 includes a sixth section 132 (positions D1 and D2) and seventh section 134 (positions D2 and D3) connected to each other. The fifth section 126 is located next to the first section 112 and the second section 114; the sixth section 132 is located between the first section 112 and the third section 122; and the seventh section 134 is located between the first section 112 and the fourth section 124. The second slot C2 (FIG. 1A) is formed between the fifth section 126 and the second section 114 and between the seventh section 134 and the first section 112.

In the embodiment, the first radiator 110 and the second radiator 120 together resonate at the low frequency band (for example, 2400 MHz to 2484 MHz) and the first high frequency band (for example, 5000 MHz to 5500 MHz), and a part (the first section 112) of the first radiator 110 and the third radiator 130 together resonate at the second high frequency band (for example, 5500 MHz to 8000 MHz).

Adjustment of the length of the fifth section 126 (positions B4 and B5) of the second radiator 120 (that is, adjusting the position B5) and the size of the second slot C2 between the first radiator 110 and the fifth section 126 (positions B4 and B5) may be made to control the central frequency and impedance matching of the low frequency band (for example, 2400 MHz to 2484 MHz).

Adjustment of the length of the first section 112 (that is, adjusting the position A2) and the size of the first slot C1 may be made to control the central frequency and impedance matching of the first high frequency band (for example, 5000 MHz to 5500 MHz).

Adjustment of the length of the seventh section 134 of the third radiator 130 (that is, adjusting the position D3), the size of the second slot C2 between the seventh section 134 of the third radiator 130 and the first section 112, and the size of the third slot C3 between the third radiator 130 and the second radiator 120 may be made to control the impedance matching of the second high frequency band (for example, 5500 MHz to 8000 MHz).

As shown in FIG. 1C, the second antenna 106 is disposed next to the ground radiator 102 and includes the second radiator 120, a fourth radiator 140 (positions X1 to X5), and a connecting section 146 (position H). The fourth radiator 140 includes a second feed end F2 located at the fourth radiator 140.

The fourth radiator 140 is connected to the second radiator 120 through the connecting section 146. The fourth radiator 140 includes an eighth section 142 (positions X1 to X4) and a ninth section 144 (positions X4 and X5) connected to each other, the connecting section 146 is connected between the third section 122 and the eighth section 142, and the ninth section 144 extends from the eighth section 142 toward the fourth section 124.

A fourth slot C4 is formed between the fourth radiator 140 and the ground radiator 102 and between the eighth section 142 of the fourth radiator 140 and the third section 122 of the second radiator 120. A fifth slot C5 is formed between the ninth section 144 of the fourth radiator 140 and the fourth section 124 of the second radiator 120. The fourth slot C4 and the fifth slot C5 are separated by the connecting section 146.

In the embodiment, the second antenna 106 is a direct feed. The second feed end F2 of the second antenna 106, the fourth radiator 140 (positions X1 to X5), the connecting section 146 (position H), the second radiator 120 (positions B1 to B5), the second radiator 120, and the ground radiator 102 (positions G1 to G5) together form a planar inverted-F antenna (PIFA) structure, fine-tuned by the fourth slot C4 and the fifth slot C5.

In the embodiment, a part (the eighth section 142) of the fourth radiator 140, the connecting section 146, and the second radiator 120 resonate at the low frequency band (for example, 2400 MHz to 2484 MHz) and a frequency band of the second high frequency band ranging from 5150 MHz to 7125 MHz (double the frequency of the low frequency band), and the fourth radiator 140, the connecting section 146, and a part (the third section 122) of the second radiator resonate at the first high frequency band.

Adjustment of the coupling spacing between the fourth slot C4 and the fifth slot C5 may be made to control the impedance matching between the first high frequency band and the frequency band of the second high frequency band ranging from 5150 MHz to 7125 MHz.

In addition, provided that a common low frequency path (that is, the second radiator 120) of the first antenna 104 is not affected, the length and width of the fifth slot C5 may be adjusted to control the central frequency and impedance matching of the low frequency band (for example, 2400 MHz to 2484 MHz) of the second antenna 106.

The first antenna 104 and the second antenna 106 of the antenna module 100 of the embodiment share the second radiator 120, which can effectively reduce the space, so the overall size is small and the antenna module 100 may be disposed on a circuit board with a length L1 of 25 mm, a width L2 of 8 mm, and a thickness of 0.4 mm. Therefore, the antenna module 100 of the embodiment can achieve dual-feed and multi-frequency antenna characteristics, and has the characteristics of simple structure, easy manufacturing, low cost, and miniaturization.

In addition, in the embodiment, a distance L3 between the first feed end F1 and the second feed end F2 is 0.25 times to 0.5 times the wavelength of the low frequency band (WiFi 2.4G, 2400 MHz to 2484 MHz), such as 20 mm, so that the antennas can be flexibly arranged in a very small space and high performance of the antennas can be maintained.

Figure 2:
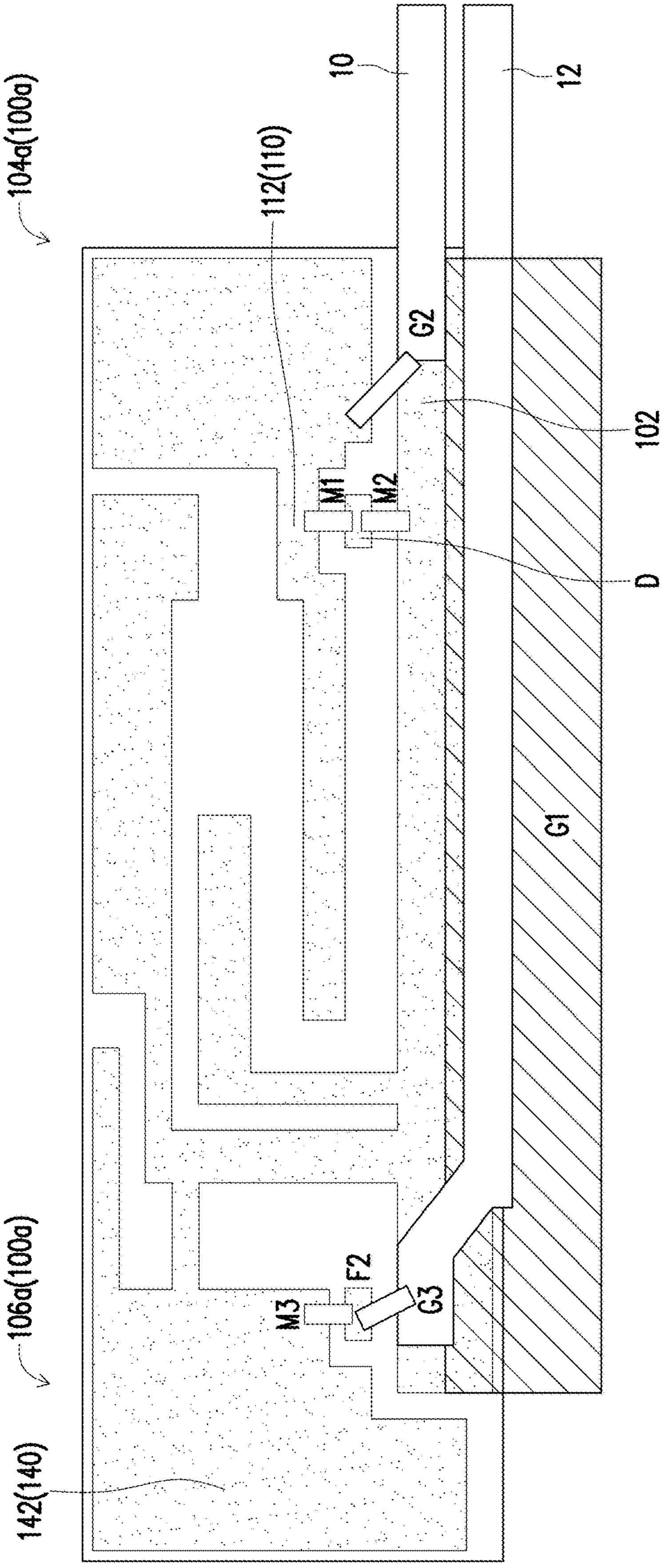
FIG. 2 is a schematic diagram of an antenna module according to another embodiment of the disclosure.

FIG. 2 is a schematic diagram of an antenna module according to another embodiment of the disclosure. Please refer to FIG. 2. The main difference between an antenna module 100*a* of FIG. 2 and the antenna module 100 of FIG. 1A is that the antenna module 100*a* of FIG. 2 further includes a first matching circuit M1 and a second matching circuit M2. In the embodiment, the first matching circuit M1 and the second matching circuit M2 are connected between the first radiator 110 and the ground radiator 102.

In the embodiment, the first matching circuit M1 includes a capacitance element (for example, capacitance 0.9 pF), the second matching circuit M2 includes an inductance element (for example, inductance 4.3 nH), and the first matching circuit M1 and the second matching circuit M2 are connected in series through a solder joint D to jointly form a band rejection filter. Certainly, the types of the first matching circuit M1 and the second matching circuit M2 are not limited thereto.

The antenna module 100 further includes a third matching circuit M3. In the embodiment, the second feed end F2 is located between the fourth radiator 140 and the ground radiator 102, and the third matching circuit M3 is connected to the second feed end F2 and the fourth radiator 140. The third matching circuit M3 includes a capacitance element (for example, capacitance 1 pF), but not limited thereto.

Since a first antenna 104*a* and a second antenna 106*a* share the second radiator 120, in order to improve the impedance matching of the second antenna 106*a*, the antenna module 100*a* of FIG. 2 improves the performance of the antennas and the isolation of the first antenna 104*a* and the second antenna 106*a* by adding the first matching circuit M1 and the second matching circuit M2. In addition, the antenna module 100*a* of FIG. 2 improves voltage standing wave ratio (VSWR) by adding the third matching circuit M3, so that the second antenna 106*a* has good impedance matching.

Figure 3:
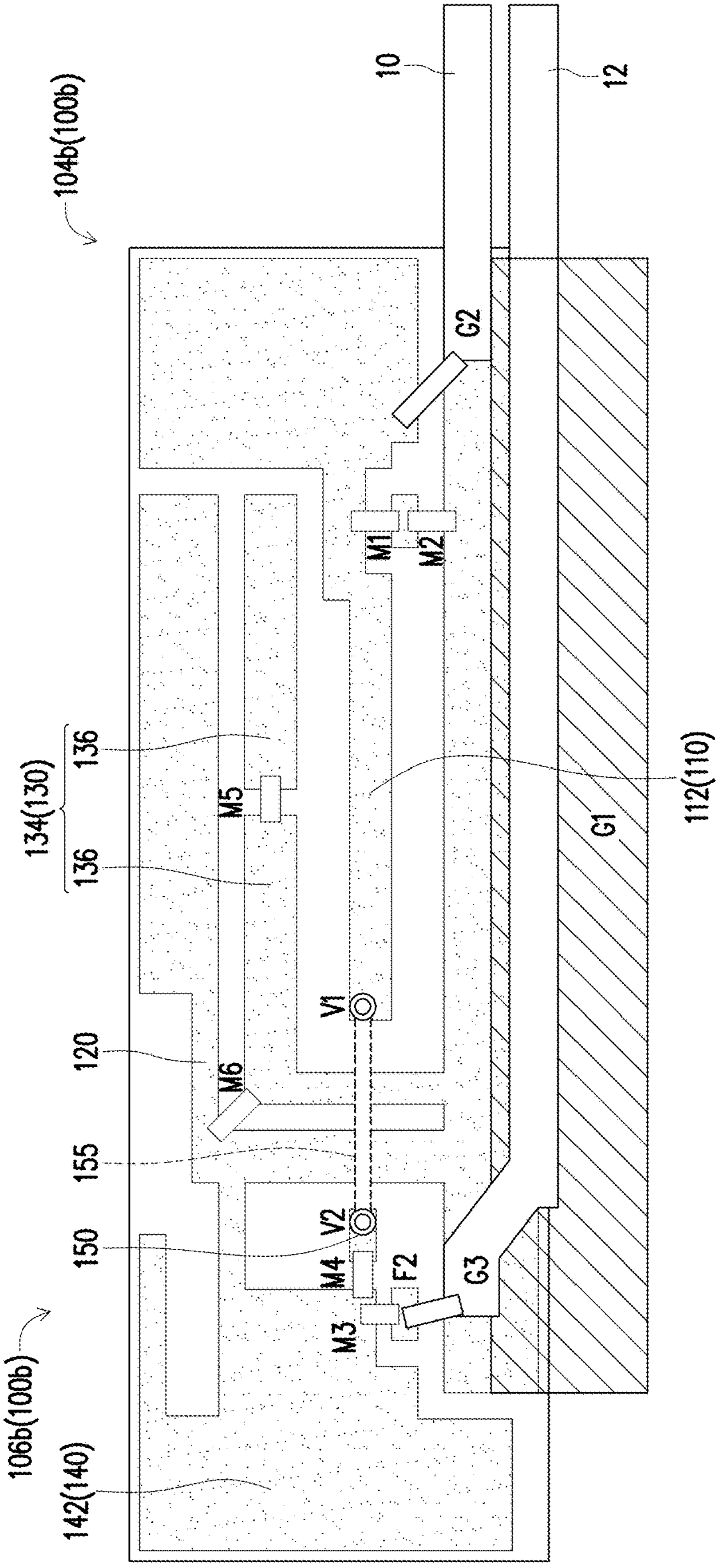
FIG. 3 is a schematic diagram of an antenna module according to yet another embodiment of the disclosure.

FIG. 3 is a schematic diagram of an antenna module according to yet another embodiment of the disclosure. Please refer to FIG. 3. The main difference between an antenna module 100*b* of FIG. 3 and the antenna module 100*a* of FIG. 2 is that the antenna module 100*b* of FIG. 3 further includes a disconnected section 150, a fourth matching circuit M4, a fifth matching circuit M5, and a sixth matching circuit M6.

The fourth matching circuit M4 is connected to the disconnected section 150 and the fourth radiator 140. The fourth matching circuit M4 is, for example, an inductance element (for example, inductance 9.1 nH), but not limited thereto.

The first section 112 of the first radiator 110 is connected to a first conductive via V1, the disconnected section 150 is connected to a second conductive via V2, and the first conductive via V1 and the second conductive via V2 are connected through a connecting line 155. The connecting line 155 and the first radiator 110 and the disconnected section 150 are located on different planes. For example, the first radiator 110 and the disconnected section 150 are located on an upper surface of the circuit board, and the connecting line 155 is located on a lower surface of the circuit board.

In addition, the seventh section 134 of the third radiator 130 includes two separate sub-sections 136, and the fifth matching circuit M5 is connected to the two sub-sections 136. The fifth matching circuit M5 is, for example, an inductance element (for example, inductance 1.5 nH), but not limited thereto. The sixth matching circuit M6 is connected to the second radiator 120 and the third radiator 130. The sixth matching circuit M6 is, for example, a capacitance element (for example, capacitance 0.5 pF), but not limited thereto.

Figure 5:
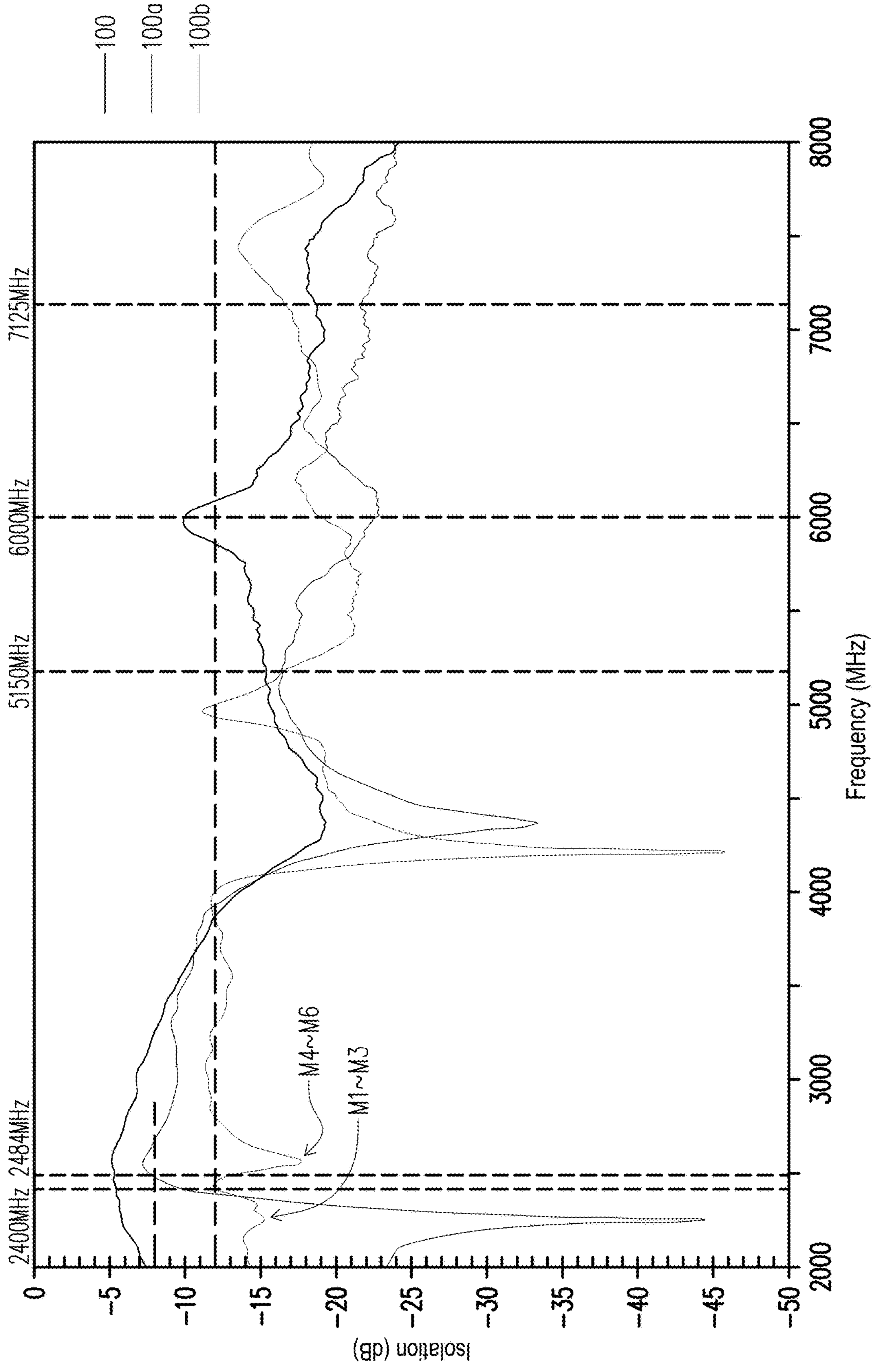
FIG. 5 is a frequency-isolation relationship diagram of the antenna module of FIG. 1A, FIG. 2, and FIG. 3.

The antenna module 100 improves the isolation of the first antenna 104*b* and the second antenna 106*b* in the low frequency band by adding the fourth matching circuit M4, the fifth matching circuit M5, and the sixth matching circuit M6. Certainly, the antenna module 100*b* of FIG. 3 also has the first matching circuit M1, the second matching circuit M2, and the third matching circuit M3 to improve the isolation of the first antenna 104 and the second antenna 106 in the low frequency band, so that the isolation of the low frequency band of the antenna module 100*b* of FIG. 3 may have the characteristics of a W-shaped filter (as shown in FIG. 5, the left trough of W is contributed by the first matching circuit M1, the second matching circuit M2, and the third matching circuit M3, and the right trough of W is contributed by the fourth matching circuit M4, the fifth matching circuit M5, and the sixth matching circuit M6).

Figure 4:
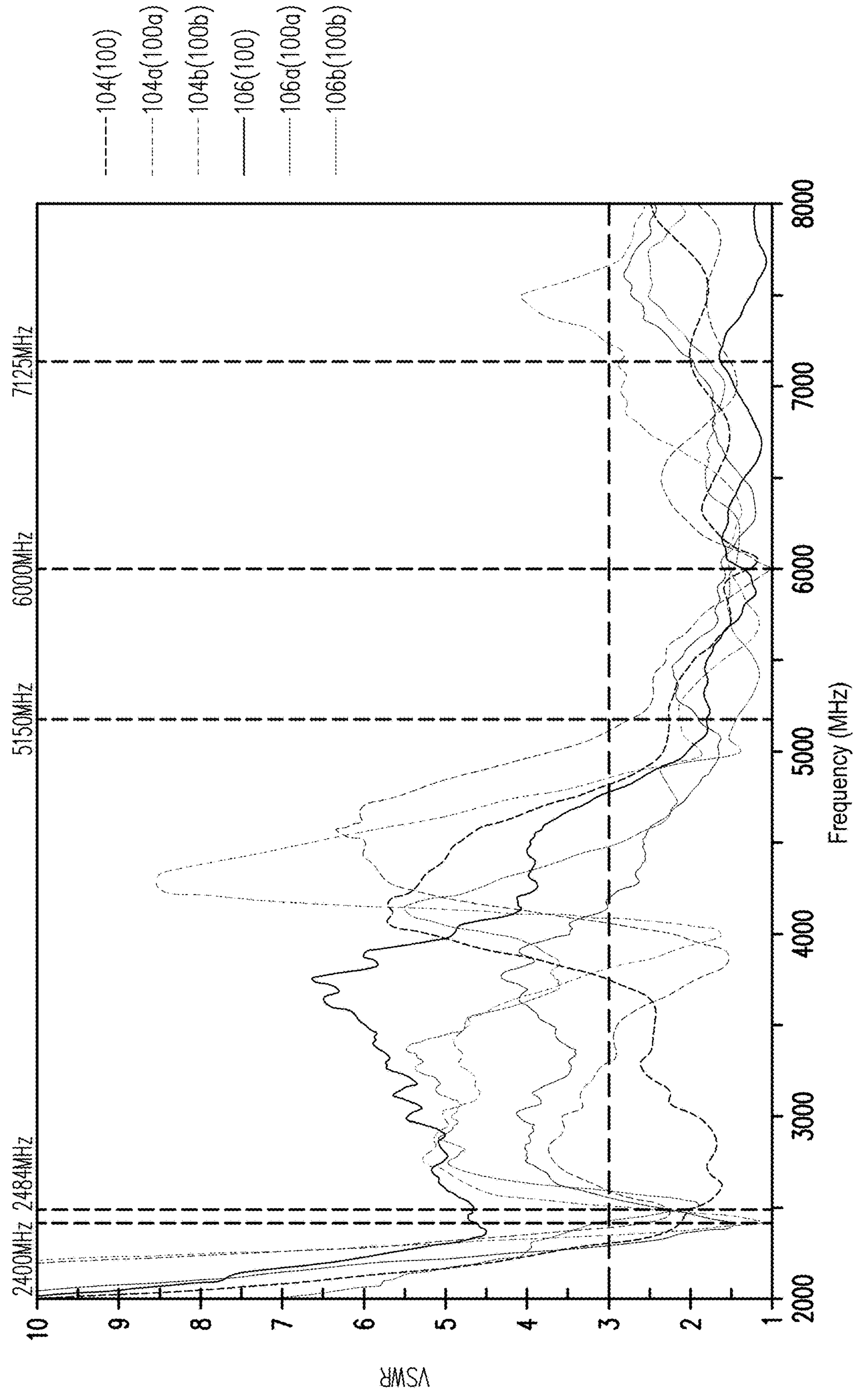
FIG. 4 is a frequency-VSWR relationship diagram of the antenna module of FIG. 1A, FIG. 2, and FIG. 3.

FIG. 4 is a frequency-VSWR relationship diagram of the antenna module of FIG. 1A, FIG. 2, and FIG. 3. FIG. 4 shows the frequency-VSWR relationship diagram of the first antennas 104, 104*a*, and 104*b* and the second antennas 106, 106*a*, and 106*b* of the antenna modules 100, 100*a*, and 100*b* of FIG. 1A, FIG. 2, and FIG. 3.

Please refer to FIG. 4. The voltage standing wave ratio (VSWR) of the first antenna 104 of the antenna module 100 of FIG. 1A in the low frequency band (Wi-Fi 2.4G, 2400 MHz to 2484 MHz) and the VSWRs of the first antenna 104 and the second antenna 106 in the first high frequency band (Wi-Fi 5G, 5150 MHz to 5850 MHz) and the second high frequency band (Wi-Fi 6E, 5925 MHz to 7125 MHz) may all be less than 3. The VSWR of the second antenna 106 in the low frequency band (2.4G, 2400 MHz to 2484 MHz) is less than 5. Therefore, the antenna module 100 has good performance.

The voltage standing wave ratios (VSWR) of the first antenna 104*a* and the second antenna 106*a* of the antenna module 100*a* of FIG. 2 in the low frequency band (Wi-Fi 2.4G, 2400 MHz to 2484 MHz), the first high frequency band (Wi-Fi 5G, 5150 MHz to 5850 MHz), and the second high frequency band (Wi-Fi 6E, 5925 MHz to 7125 MHz) may all be less than 3. Therefore, the antenna module 100*a* has the effect of broadband.

The voltage standing wave ratios (VSWRs) of the first antenna 104*b* and the second antenna 106*b* of the antenna module 100*b* of FIG. 3 in the low frequency band (Wi-Fi 2.4G, 2400 MHz to 2484 MHz) are below 3.5, and the voltage standing wave ratios (VSWRs) in the first high frequency band (Wi-Fi 5G, 5150 MHz to 5850 MHz) and the second high frequency band (Wi-Fi 6E, 5925 MHz to 7125 MHz) are below 3. Therefore, the effect of dual antenna broadband is produced.

FIG. 5 is a frequency-isolation relationship diagram of the antenna module of FIG. 1A, FIG. 2, and FIG. 3. Please refer to FIG. 5. The isolation of the antenna module 100 of FIG. 1A in the low frequency band (Wi-Fi 2.4G, 2400 MHz to 2484 MHz) is below −5 dB, and the isolation in the first high frequency band (Wi-Fi 5G, 5150 MHz to 5850 MHz) and the second high frequency band (Wi-Fi 6E, 5925 MHz to 7125 MHz) is below −10 dB. Therefore, good isolation performance is achieved.

The isolation of the antenna module 100*a* of FIG. 2 in the low frequency band (Wi-Fi 2.4G, 2400 MHz to 2484 MHz) is below −8 dB, and the isolation in the first high frequency band (Wi-Fi 5G, 5150 MHz to 5850 MHz) and the second high frequency band (Wi-Fi 6E, 5925 MHz to 7125 MHz) is below −15 dB. Therefore, good isolation performance is achieved. The isolation of the antenna module 100*b* of FIG. 3 in the low frequency band (Wi-Fi 2.4G, 2400 MHz to 2484 MHz) can be improved to be below −12 dB, and the isolation in the first high frequency band (Wi-Fi 5G, 5150 MHz to 5850 MHz) and the second high frequency band (Wi-Fi 6E, 5925 MHz to 7125 MHz) is below −15 dB. Therefore, the isolation performance at low frequencies is improved.

Figure 6:
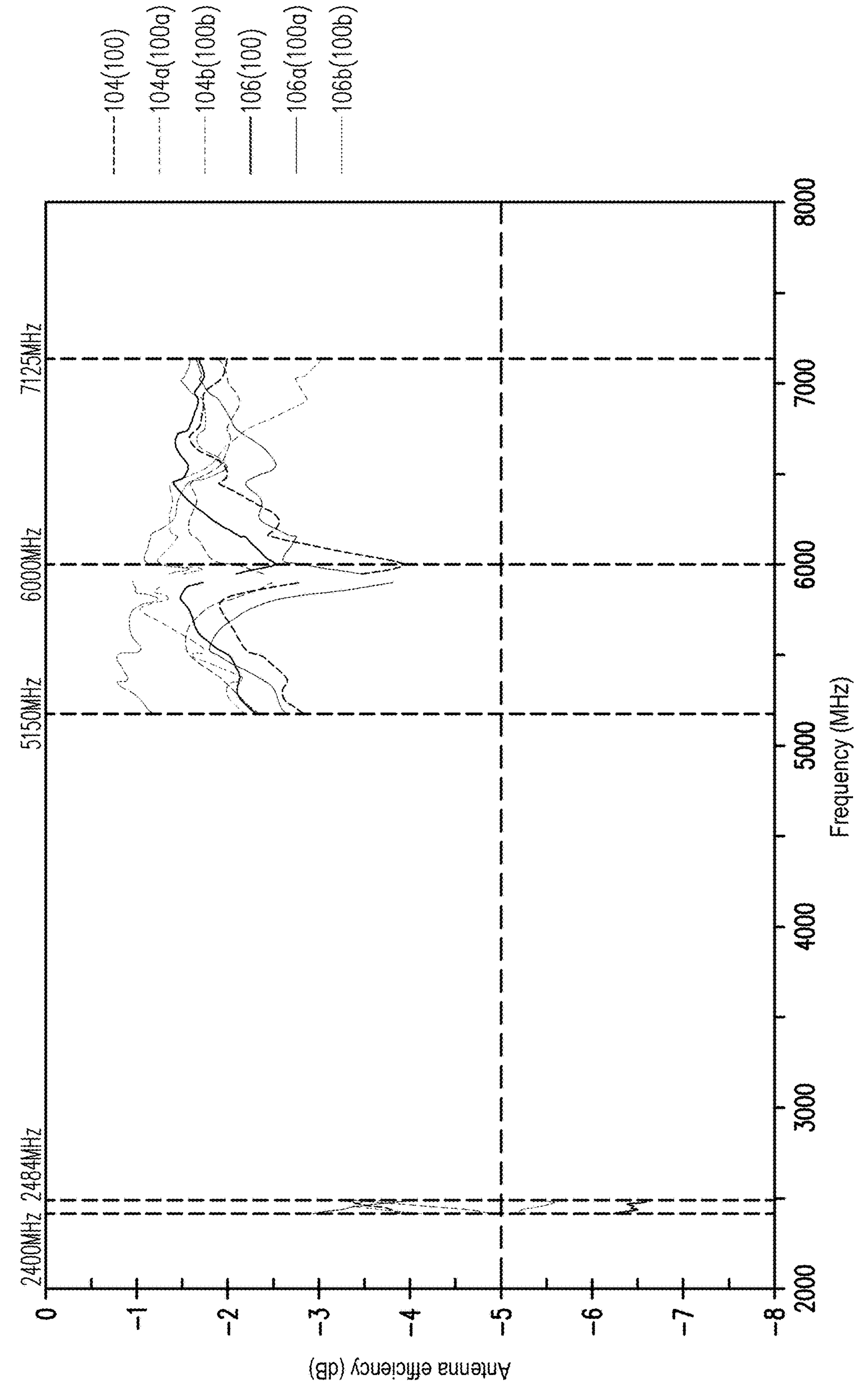
FIG. 6 is a frequency-antenna efficiency relationship diagram of the antenna module of FIG. 1A, FIG. 2, and FIG. 3.

FIG. 6 is a frequency-antenna efficiency relationship diagram of the antenna module of FIG. 1A, FIG. 2, and FIG. 3. Please refer to FIG. 6. The antenna efficiency of the first antenna 104 and the second antenna 106 of the antenna module 100 of FIG. 1A in the low frequency band (Wi-Fi 2.4G, 2400 MHz to 2484 MHz), the first high frequency band (Wi-Fi 5G, 5150 MHz to 5850 MHz), and the second high frequency band (Wi-Fi 6E, 5925 MHz to 7125 MHz) are all above −5.5 dBi.

The antenna efficiency of the first antenna 104*a* and the second antenna 106*a* of the antenna module 100*a* of FIG. 2 in the low frequency band (Wi-Fi 2.4G, 2400 MHz to 2484 MHz) falls in −3.1 dBi to −4.9 dBi, the antenna efficiency in the first high frequency band (Wi-Fi 5G, 5150 MHz to 5850 MHz) falls in −1.6 dBi to −3.9 dBi, and the antenna efficiency in the second high frequency band (Wi-Fi 6E, 5925 MHz to 7125 MHz) falls in −1.6 dBi to −3.5 dBi. Therefore, good antenna performance is achieved in the reduced space.

The antenna efficiency of the first antenna 104*b* and the second antenna 106*b* of the antenna module 100*b* of FIG. 3 in the low frequency band (Wi-Fi 2.4G, 2400 MHz to 2484 MHz) falls in −3.4 dBi to −5.6 dBi, the antenna efficiency in the first high frequency band (Wi-Fi 5G, 5150 MHz to 5850 MHz) falls in −1.0 dBi to −2.2 dBi, and the antenna efficiency in the second high frequency band (Wi-Fi 6E, 5925 MHz to 7125 MHz) falls in −1.1 dBi to −3.1 dBi. Therefore, good dual antenna performance is achieved in the reduced space.

The antenna modules 100, 100*a*, and 100*b* of the disclosure may integrate four sets of 8×8 multiple-input multiple-output (MIMO) antennas to be disposed on the same system device, which can effectively improve the spectrum efficiency of the wireless communication system to increase the transmission rate and improve communication quality. Furthermore, the dual antennas may be individually connected to a switch in series for switching circuits, and the radiation directions of WiFi 5G/6E frequency bands may be arbitrarily switched, increasing the transmission or reception ability of each MIMO antenna. At the same time, beam forming technology may be introduced, so that the coverage of wireless transmission and the application of directional angle are broader. In addition, the antenna modules 100, 100*a*, and 100*b* of the disclosure reduce the sizes of the antenna radiators and share the low frequency path.

In summary, the antenna module of the disclosure includes the first antenna and the second antenna. The first antenna and the second antenna share the second radiator. The first antenna may resonate at the low frequency band and the first high frequency band through the first radiator and the second radiator, and the part of the first radiator and the third radiator may resonate at the second high frequency band. The second antenna may resonate at the low frequency band and the second high frequency band through the part of the fourth radiator, the connecting section, and the second radiator, and resonate at the first high frequency band through the fourth radiator, the connecting section, and the part of the second radiator. Each of the first antenna and the second antenna of the antenna module of the disclosure may resonate at multiple frequency bands, and the first antenna and the second antenna share the second radiator, which can effectively reduce the occupied space.

What is claimed is:

1. An antenna module, comprising:

a ground radiator;

a first antenna, disposed next to the ground radiator and comprising a first radiator, a second radiator, and a third radiator, wherein the second radiator and the third radiator are connected to the ground radiator, the first radiator and the second radiator resonate at a low frequency band and a first high frequency band, and a part of the first radiator and the third radiator resonate at a second high frequency band; and a second antenna, disposed next to the ground radiator and comprising a fourth radiator, the second radiator, and a connecting section, wherein the connecting section connects the fourth radiator with the second radiator, a part of the fourth radiator, the connecting section, and the second radiator resonate at the low frequency band and the second high frequency band, and the fourth radiator, the connecting section, and a part of the second radiator resonate at the first high frequency band.

2. The antenna module according to claim 1, wherein a first slot is formed between the first radiator and the ground radiator, a second slot is formed between the first radiator and the second radiator and between the first radiator and the third radiator, a third slot is formed between the second radiator and the third radiator, a fourth slot is formed between the fourth radiator and the ground radiator and between the fourth radiator and the second radiator, a fifth slot is formed between the fourth radiator and the second radiator, and the connecting section separates the fourth slot from the fifth slot.

3. The antenna module according to claim 2, wherein the first radiator comprises a first section and a second section connected with each other, the second radiator comprises a third section, a fourth section, and a fifth section connected in sequence, the third radiator comprises a sixth section and a seventh section connected with each other, the first slot is formed between the first section and the ground radiator, the fifth section is located next to the first section and the second section, the sixth section is located between the first section and the third section, the seventh section is located between the first section and the fourth section, the second slot is formed between the fifth section and the second section and between the seventh section and the first section, the part of the first radiator is the first section, and the part of the second radiator is the third section.

4. The antenna module according to claim 3, wherein the fourth radiator comprises a eighth section and a ninth section connected with each other, the connecting section connects the third section with the eighth section, the ninth section extends from the eighth section toward the fourth section, the fourth slot is formed between the eighth section and the third section, the fifth slot is formed between the ninth section and the fourth section, and the part of the fourth radiator is the eighth section.

5. The antenna module according to claim 1, wherein the first radiator comprises a first feed end, the fourth radiator comprises a second feed end, and a distance between the first feed end and the second feed end is 0.25 times to 0.5 times a wavelength of the low frequency band.

6. The antenna module according to claim 1, further comprising a first matching circuit and a second matching circuit, wherein the first matching circuit and the second matching circuit are connected between the first radiator and the ground radiator.

7. The antenna module according to claim 6, wherein the first matching circuit comprises a capacitance element, the second matching circuit comprises an inductance element, and the first matching circuit and the second matching circuit jointly form a band rejection filter.

8. The antenna module according to claim 1, further comprising a second feed end and a third matching circuit, wherein the second feed end is located between the fourth radiator and the ground radiator, and the third matching circuit is connected to the second feed end and the fourth radiator.

9. The antenna module according to claim 1, further comprising a disconnected section and a fourth matching circuit, wherein the fourth matching circuit is connected to the disconnected section and the fourth radiator, the part of the first radiator is connected to a first conductive via, the disconnected section is connected to a second conductive via, the first conductive via and the second conductive via are connected through a connecting line, and the connecting line and the first radiator and the disconnected section are located on different planes.

10. The antenna module according to claim 1, further comprising a fifth matching circuit, wherein a seventh section of the third radiator comprises two separate sub-sections, and the fifth matching circuit is connected to the two sub-sections.

11. The antenna module according to claim 1, further comprising a sixth matching circuit connected to the second radiator and the third radiator.

* * * * *